United States Patent
Teraoka et al.

(10) Patent No.: US 11,517,971 B2
(45) Date of Patent: Dec. 6, 2022

(54) SUPPORT STAND FOR HEATING TOOLS

(71) Applicant: Hakko Corporation, Osaka (JP)

(72) Inventors: Yoshitomo Teraoka, Osaka (JP); Hisao Nemoto, Osaka (JP)

(73) Assignee: HAKKO Corporation

( * ) Notice: Subject to any disclaimer, the term of this patent is extended or adjusted under 35 U.S.C. 154(b) by 257 days.

(21) Appl. No.: 15/930,279

(22) Filed: May 12, 2020

(65) Prior Publication Data
US 2021/0354225 A1    Nov. 18, 2021

(51) Int. Cl.
*B23K 3/00* (2006.01)
*B23K 3/02* (2006.01)
*B23K 3/03* (2006.01)

(52) U.S. Cl.
CPC ................ *B23K 3/027* (2013.01); *B23K 3/03* (2013.01)

(58) Field of Classification Search
CPC ...... B23K 3/027; B23K 3/03; B23K 3/00–08; B23K 5/24
USPC .............................. 228/51–55, 191, 119, 264
See application file for complete search history.

(56) References Cited

U.S. PATENT DOCUMENTS

| | | | | |
|---|---|---|---|---|
| 1,333,616 A | * | 3/1920 | Hall | B23K 3/08 248/314 |
| 1,616,721 A | * | 2/1927 | Vallin | B23K 3/08 219/242 |
| 1,789,475 A | * | 1/1931 | Powell | B23K 3/027 165/181 |
| 2,281,162 A | * | 4/1942 | Kuehl | B23K 3/027 219/242 |
| 2,327,073 A | * | 8/1943 | Smith, Jr. | B23K 3/027 219/242 |
| 2,355,883 A | * | 8/1944 | Mathews | B23K 3/027 165/68 |
| 2,475,941 A | * | 7/1949 | Brothers | B23K 3/027 219/242 |
| 2,527,435 A | * | 10/1950 | Little | B23K 3/027 248/117.7 |
| 3,215,815 A | * | 11/1965 | Lerner | B23K 3/027 248/176.1 |
| 3,267,254 A | * | 8/1966 | Weller | H01F 27/40 248/314 |
| 3,924,097 A | * | 12/1975 | Knowles | B23K 3/027 219/229 |
| 3,948,678 A | * | 4/1976 | Dezzani | B23K 3/028 15/210.1 |
| 3,990,623 A | * | 11/1976 | Fortune | B23K 3/027 248/176.2 |
| 4,456,816 A | * | 6/1984 | Fortune | B23K 3/027 228/19 |
| 4,671,476 A | * | 6/1987 | Yim | B23K 3/027 248/176.2 |
| 4,762,979 A | * | 8/1988 | Geoffroi | B23K 3/027 269/254 R |

(Continued)

FOREIGN PATENT DOCUMENTS

| | | | | |
|---|---|---|---|---|
| DE | 3100284 A1 | * | 8/1982 | |
| EP | 2181794 A1 | * | 5/2010 | ............ B23K 3/027 |
| JP | 08219899 A | * | 8/1996 | ............ B23K 3/033 |

*Primary Examiner* — Kiley S Stoner
(74) *Attorney, Agent, or Firm* — David B. Abel

(57) ABSTRACT

A support stand for a soldering or de-soldering handheld tool comprises a base and a cradle for supporting the handheld tool when it is not in use that protects the surrounding work area and accommodates user preferences.

12 Claims, 8 Drawing Sheets

(56) References Cited

U.S. PATENT DOCUMENTS

| | | | | |
|---|---|---|---|---|
| 5,446,262 A * | 8/1995 | McCambridge | B23K 3/0315 | 219/229 |
| 5,472,133 A * | 12/1995 | Lin | B23K 3/027 | 228/8 |
| 5,524,809 A * | 6/1996 | Kosslow | B23K 3/0369 | 219/230 |
| 5,683,603 A * | 11/1997 | Fortune | B23K 3/026 | 228/55 |
| 5,796,072 A * | 8/1998 | Okuno | B23K 3/03 | 219/229 |
| 5,804,795 A * | 9/1998 | Fortune | B23K 3/0473 | 219/229 |
| 6,744,003 B1 | 6/2004 | Ono | B23K 3/025 | 228/33 |
| 7,964,822 B2 * | 6/2011 | Suen | B44D 3/164 | 15/93.4 |
| 10,486,254 B1 * | 11/2019 | Yang | B25F 5/02 | |
| 2002/0042960 A1 * | 4/2002 | Hayashi | B08B 1/04 | 15/93.1 |
| 2008/0067164 A1 * | 3/2008 | Kuo | B23K 3/027 | 219/242 |
| 2008/0179309 A1 * | 7/2008 | Markovsky | B23K 3/026 | 219/229 |
| 2010/0089975 A1 * | 4/2010 | Martin | B23K 3/022 | 228/51 |
| 2010/0108827 A1 * | 5/2010 | Teraoka | B23K 3/027 | 248/117.2 |
| 2011/0073583 A1 * | 3/2011 | Liu | B23K 3/033 | 219/229 |
| 2011/0139854 A1 * | 6/2011 | Custer | B23K 37/0426 | 228/44.3 |
| 2015/0202753 A1 * | 7/2015 | Mittmann | B23K 3/0338 | 362/120 |
| 2016/0361771 A1 * | 12/2016 | Stuckey | B23K 3/08 | |
| 2017/0165771 A1 * | 6/2017 | Teraoka | B23K 3/029 | |
| 2018/0111213 A1 * | 4/2018 | Mantes | B23K 3/0323 | |
| 2019/0099885 A1 * | 4/2019 | Teraoka | B25J 11/005 | |
| 2019/0134730 A1 * | 5/2019 | Teraoka | B23K 3/033 | |
| 2019/0217410 A1 * | 7/2019 | Nguyen | B23K 3/0478 | |
| 2020/0009672 A1 * | 1/2020 | Wu | B25F 5/02 | |
| 2020/0078880 A1 * | 3/2020 | Wu | B23K 3/02 | |
| 2020/0086472 A1 * | 3/2020 | Storey | F23D 14/72 | |

* cited by examiner

SUPPORT STAND FOR HEATING TOOLS

FIELD OF THE INVENTION

The present invention relates to a support stand which supports a heating tool.

BACKGROUND OF THE INVENTION

The assembly and repair of electrical devices generally requires a human operator to utilize several different tools, including various hand-held heating devices such as a soldering iron for electrically securing components, a de-soldering tool for melting and removing solder to allow rework or repair, and a hot air device that may be required for heat shrink insulation. Often the operator may require all of these heating devices, along with a number of hand tools and electrical components, on the work surface of a work bench to work efficiently. However, the heating devices may easily damage electrical components, or injure the operator if they are carelessly set aside when not in use.

A diligent user may prefer placing the heating devices in some type of holder or support stand. The positioning of the heating devices in the holder or stand often depends on the user. Some users prefer putting the handle of the heating device obliquely downward toward the top surface of the work bench, and others prefer putting the handle of the heating device obliquely upward with respect to the top surface of the work bench. The orientation may depend upon how the particular user lifts and holds the heating device.

BRIEF DESCRIPTION OF THE INVENTION

The present invention provides various alternative embodiments of a support stand for heating devices that may accommodate a number of different heating devices and user preferred positioning of the heating devices when they are not in use. In addition, the present invention provides a shield to isolate the hot portion of the heating devices so that they do not damage electrical components or injure the user.

In one embodiment of the invention, the support stand includes a cradle pivotally mounted to a base, the cradle including one or more projections or stepped section on the inner surface of the cradle to engage portions of the heating device when the handle of the heating device is placed in the cradle of the support stand. The user can hook or engage the handle of the heating device on the projections or stepped section regardless of the direction of placement of the handle. Therefore the user can place the heating device on the support stand easily and stably.

DETAILED DESCRIPTION OF THE INVENTION

Figure 1:
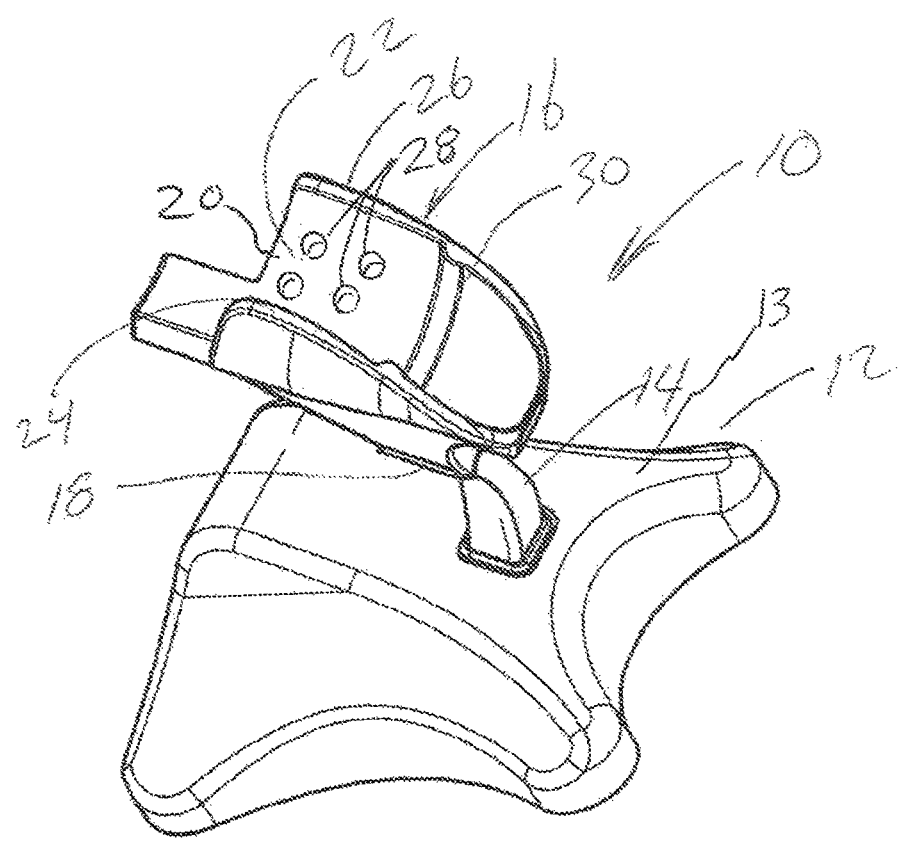
FIG. 1 is a perspective view of a first embodiment of a support stand for a heating device.

FIG. 1 is a perspective view of a first embodiment of a support stand 10. The support stand includes a base 12 including a sloped upper surface 13, a leg member 14 and a cradle 16. The cradle 16 includes a mount 18 to secure the leg member 14 to the cradle. Alternatively, the mount 18 may be configured so that the leg member 14 may be removable to allow easy repair or replacement. The cradle 16 defines a partial generally cylindrical section 20 defining an inner surface 22, a first upwardly projecting side 24 and a second upwardly projecting side 26 so that a handle of a heating device may be rested in a space between said first side and said second side as described below. The cradle 16 further includes at least one type of projection 30 on the inner surface 22, strategically positioned to allow balance.

Figure 2:
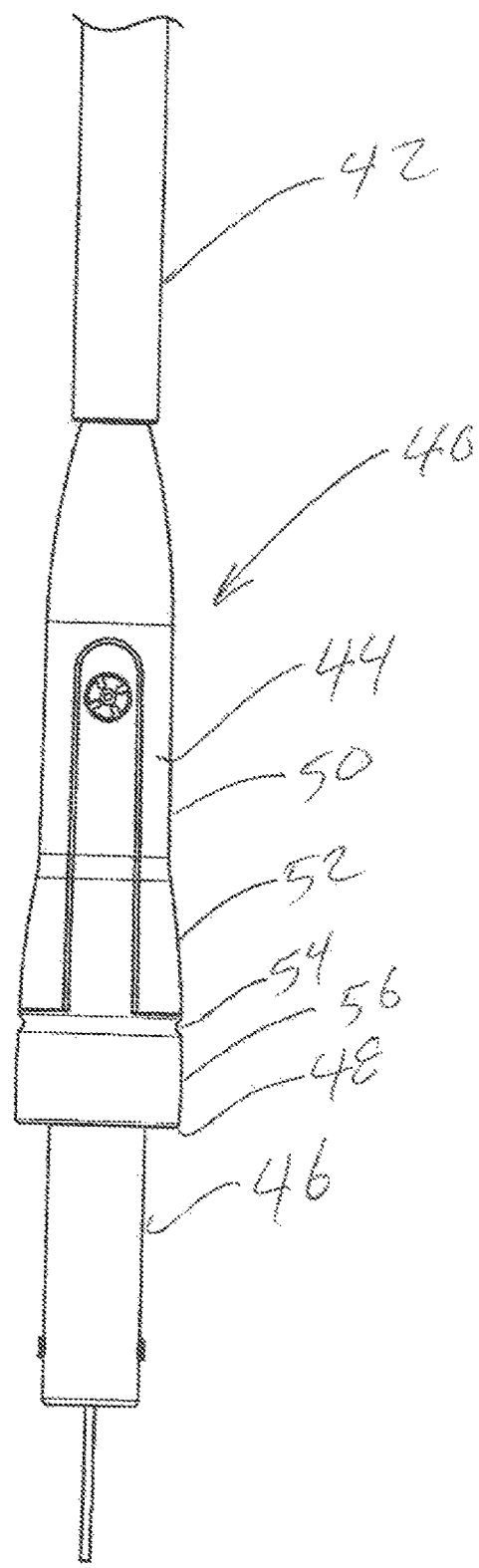
FIG. 2 is a perspective view of an exemplary configuration of a heating device that may be accommodated by the support stands of the present invention.

FIG. 2 is a perspective view of an exemplary configuration of a heating device 40. The heating device 40 may be a hot air blower, a soldering iron, a de-soldering tool or another type of tool which uses thermal energy. The heating device 40 is intended to be connected to a power supply by a cable 42, and held by a user gripping an insulated handle section 44. A heating assembly portion 46 extends from a distal end 48 of the insulated handle section 44. The insulated handle section 44 further includes a first cylindrical section 50, a beveled section 52 that flares to a greater diameter than the diameter of the cylindrical section 50, a groove 54 at the distal end of the beveled section 52, and a second cylindrical section 56 extending from the groove 54 to the distal end 48 of the handle section 44.

Figure 3:
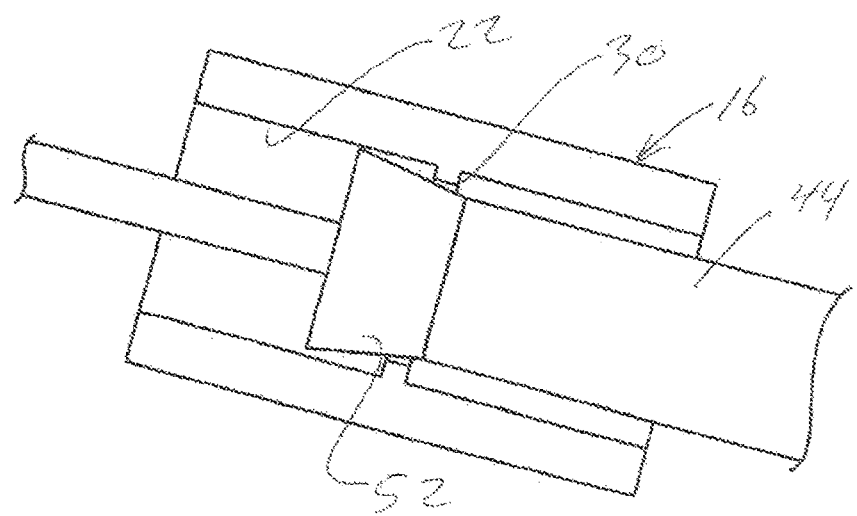
FIG. 3 is a simplified top-view of the cradle portion of the support stand of FIG. 1 and the central portion of the heating device of FIG. 2 positioned in a first orientation.
Figure 4:
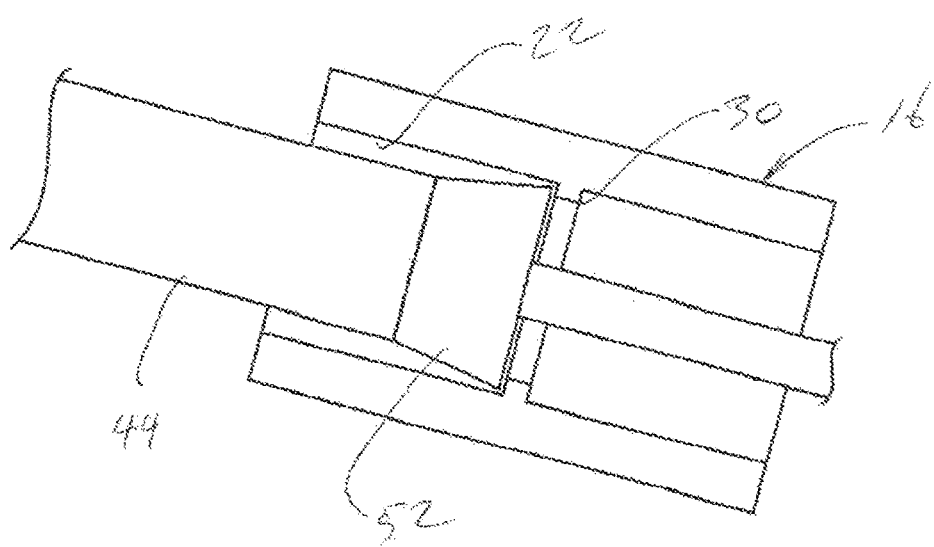
FIG. 4 is a simplified top-view of the cradle portion of the support stand of FIG. 1 and the central portion of the heating device of FIG. 2 positioned in a second orientation.

The configuration of the support stand 10 and the heating device 40 allows the heating device 40 to be placed in the support stand in either direction so that the heating device 40 may be oriented in either an upward angled or downward angled direction. To illustrate this concept, FIG. 3 is a simplified top-view of the cradle portion of the support stand of FIG. 1 and the central portion of the heating device 40 of FIG. 2 positioned in a first orientation obliquely upward. FIG. 4 is a simplified top-view of the cradle portion of the support stand of FIG. 1 and the central portion of the heating device of FIG. 2 positioned in a second or opposite orientation obliquely downward. In the configuration of FIG. 3, the beveled portion 52 of the handle section 44 engages the projection 30 on the inner surface 22 of the cradle 16. In the configuration of FIG. 4, the distal end of the beveled portion 52 (or the distal end of the second cylindrical section depicted in FIG. 2), engages the projection 30 on the inner surface 22 of the cradle 16. In either orientation, the engagement with the projection 30 prevents the heating device 40 from slipping downward.

Figure 5:
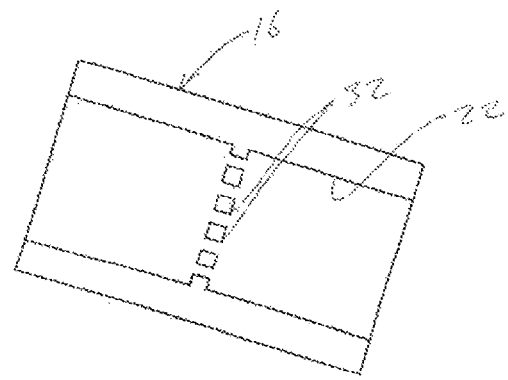
FIG. 5 is a simplified top-view of one embodiment of the cradle portion of the support stand of FIG. 1.
Figure 6:
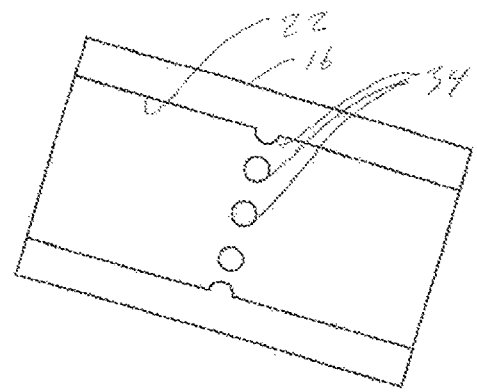
FIG. 6 is a simplified top-view of a second embodiment of the cradle portion of the support stand of FIG. 1.
Figure 7:
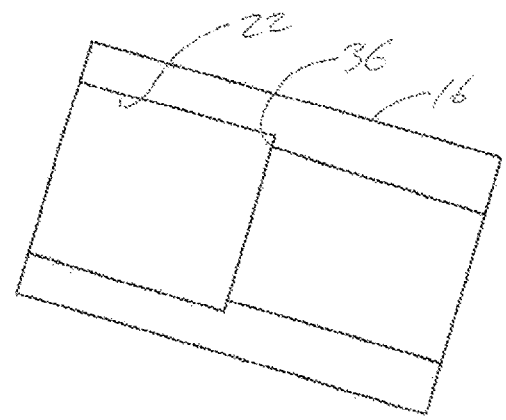
FIG. 7 is a simplified top-view of a third embodiment of the cradle portion of the support stand of FIG. 1.

In FIGS. 1, 3 and 4, the projection 30 is depicted as a ridge 30 projecting inwardly from the inner surface 22. Alternative configurations of the projection 30 on the inner surface 22 of the cradle 16 are depicted in FIGS. 5, 6 and 7. In FIG. 5, the projection 30 comprises projecting pillars 32 on the inner surface 22 of the cradle 16. The projecting pillars 32 may be configured as low-height quadratic prisms. In FIG. 6 the projection 30 comprises projecting bumps 34 on the inner surface 22 of the cradle 16. Projecting bumps 34 may be formed in hemispherical shapes. In FIG. 7, projection 30 comprises a step 36 on the inner surface 22, whereby the cradle 16 has first thickness and a second thickness. In each of these configurations, the beveled portion 52 (or the distal end of the second cylindrical section depicted in FIG. 2), engages the projecting pillars 32, projecting bumps 34, the step 36 or ridge 30.

To accommodate a user's preferences as well as various configurations for the heating devices to be rested in the support stand 10, the inner surface 22 may include a plurality of holes or openings 28 positioned in a pattern and the projecting pillars 32, the projecting bumps 34 or the ridge 30 each include a underside having projections sized to securely fit in the holes or openings of the inner surface 22, whereby the user can reposition the pillars 32, bumps 34 or ridge 30 in various locations of said inner surface 22. Thus, a user may place the respective projection at different locations along the axial length of the cradle 16 to balance different configurations of the heating device 40.

Figure 8:
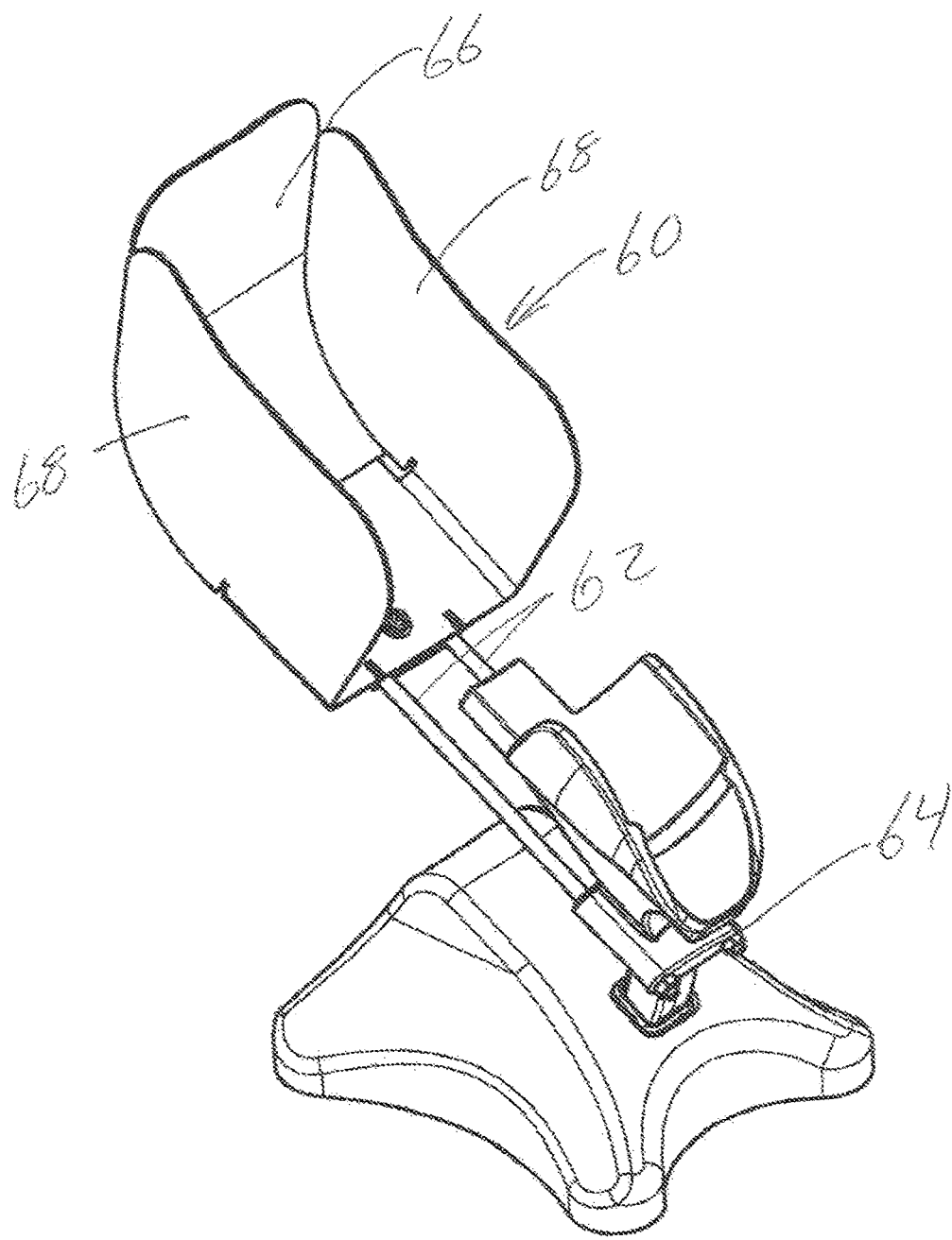
FIG. 8 is a perspective view of the first embodiment of the support stand for a heating device with an additional cover unit heat shield assembly.

FIG. 8 is a perspective view of the first embodiment of the support stand 10 for a heating device with an additional cover unit 60 defining a heat shield assembly. The cover unit 60 includes two projection rods 62 that may be inserted into receiving sections 64 attached to the mount 18 of the cradle 16. The cover unit 60 further includes a seat shaped section including a base curving into an end section 66 and two sidewalls 68. The section 66 and sidewalls 68 may be fabricated from metal or high temperature resistant plastic materials to prevent the heating assembly portion 46 of the heating device 40 from damaging nearby electrical components or burning the user. The cover unit 60 has an open upper side that allows for heat dissipation.

Figure 9:
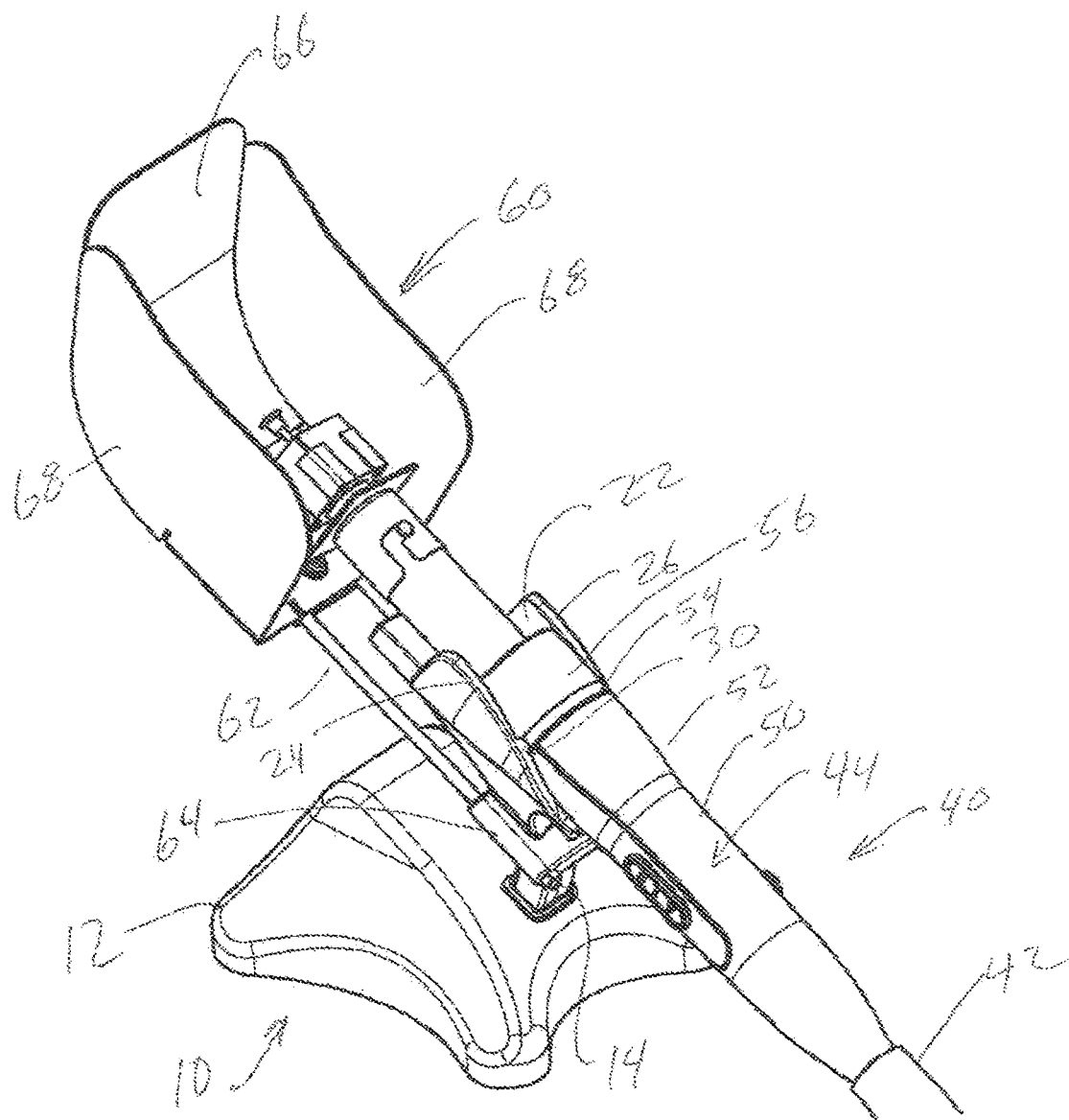
FIG. 9 is a perspective view of the support stand and cover unit of FIG. 8 with an exemplary heating device.

FIG. 9 is a perspective view of the support stand 10 and cover unit 60 of FIG. 8 with an exemplary heating device 40. When the heating device 40 is placed in the cradle 16 of the support stand 10, the beveled section 52 of the handle section 44 engages the projection 30 in the inner surface 22 of the cradle 16, preventing axial movement. Alternatively, when the heating device 40 is placed in the cradle 16 of the support stand 10, the groove 54 at the distal end of the beveled section 52 of the handle section 44 may engage the projection 30 on the inner surface 22 of the cradle 16. The heating assembly portion 46 extends into the cover unit 60, without contacting the end section 66 or sidewalls 68. As depicted in FIG. 9, a hot air blower attachment is secured to the heating assembly portion 46. The hot air from the attachment collides with the cover unit 60 and goes up, so that objects around the hot air blower attachment are not exposed to high temperature.

Figure 10:
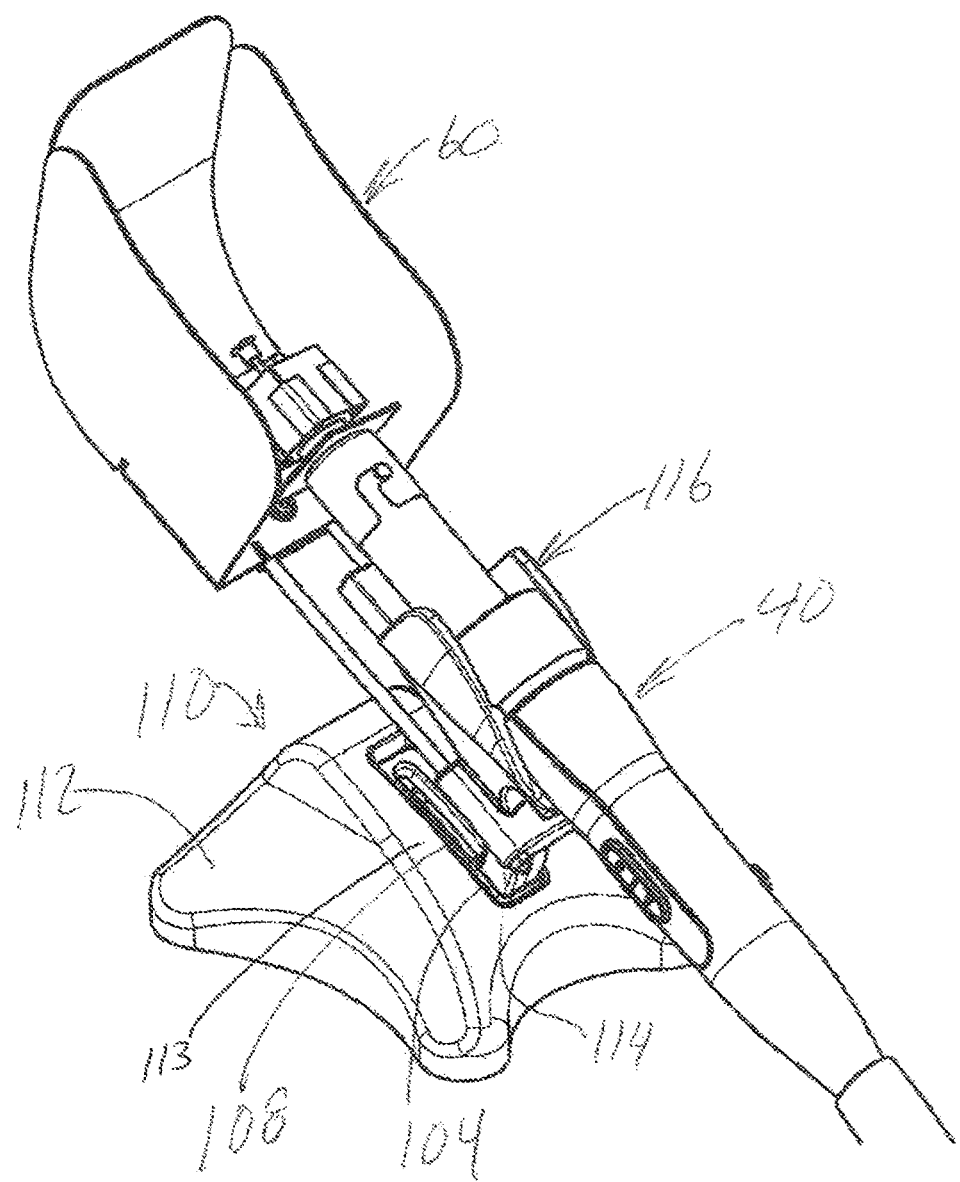
FIG. 10 is a perspective view of an alternative configuration of a support stand and cover unit with an exemplary heating device.
Figure 11:
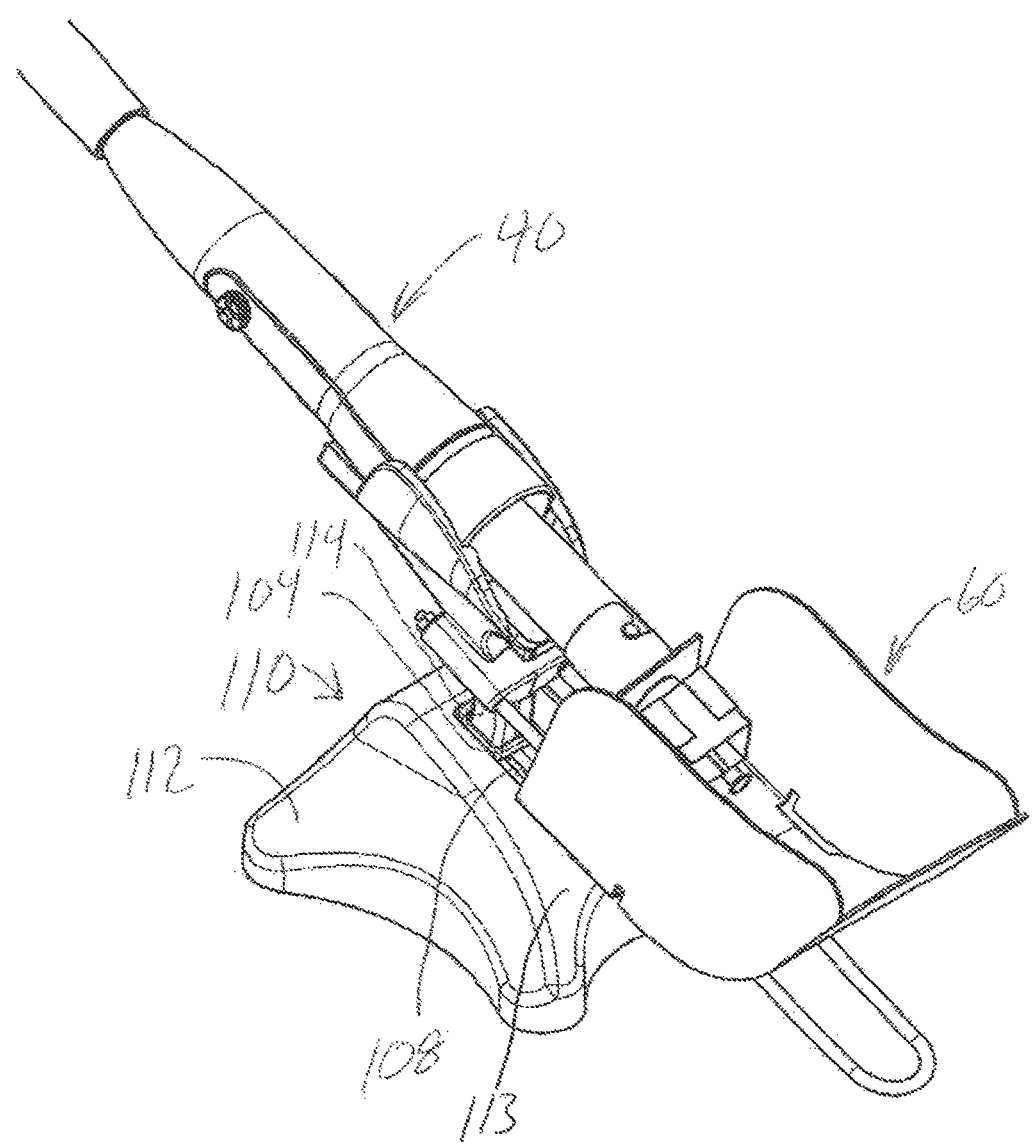
FIG. 11 is a perspective view of the alternative configuration of a support stand and cover unit with an exemplary heating device of FIG. 10, with the heating device oriented in an opposite position.

FIG. 10 is a perspective view of an alternative configuration of a support stand 110 and cover unit 60 with an exemplary heating device, and FIG. 11 is a perspective view of the alternative configuration with the heating device oriented in an opposite position. In the embodiments of FIGS. 10 and 11, support stand 110 includes a base 112 having a slopped upper surface 113 and a leg 114. The support stand 110 further includes an elongated receiving slot 108 on the upper surface 113 into which a bottom end 104 of the leg 114 is inserted and secured. The configuration of the elongated receiving slot 108 allows the user to position the leg 114, and thus the cradle 116, in a comfortable position for the user while maintaining the balance for the heating device 40. The user may fix the location of the leg 114 mounting to the receiving slot 108 using screws (not shown) accessed from the underside of the base 112. In this configuration, the support stand 110 has an adjusting mechanism in order to prevent the heating device 40 from interfering with the work bench.

Those skilled in the art will readily appreciate that the disclosure herein is meant to be exemplary and actual parameters and materials depend upon the specific application for which the process and materials of the present invention are used. The foregoing embodiments are presented by way of example while the scope of the invention is defined by the appended claims and equivalents thereto.

The invention claimed is:

1. A heating tool set comprising a heating device and a support stand, wherein said heating device comprises:
   an insulated handle section including a first cylindrical section, a beveled section that flares to a greater diameter than a diameter of said first cylindrical section; and
   a heating assembly portion extending from a distal end of said insulated handle section;
   and wherein said support stand comprises:
   a base;
   a leg member securable to said base; and
   a cradle secured to said leg member, said cradle defining a partial cylindrical section defining an inner surface including at least one type of projection positioned to balance said heating device by engaging said insulated handle section at said beveled section.

2. The heating tool set of claim 1 wherein said heating device is selected from the group consisting of a hot air blower, a soldering iron, and a de-soldering tool.

3. The heating tool set of claim 1, wherein said heating tool further comprises a groove formed in a handle portion of said heating tool and said support stand includes at least one type of projection in said cradle positioned to balance said heating device by projecting into said groove at the distal end of the beveled section of said insulated handle section.

4. The heating tool set of claim 1, wherein said support stand is configured for supporting said heating device having said insulated handle section including said first cylindrical section and said beveled section, wherein said projections on said inner surface of said cradle are positioned to abut a proximal portion of said beveled section when said heating device is angled obliquely upward and said projections on said inner surface of said cradle are positioned to abut a distal end of said beveled section when said heating device is angled obliquely downward.

5. The heating tool set of claim 1, wherein said heating device support stand further comprises:
   said base having an upper surface including a receiving slot;
   said leg member having a lower end removably securable to said receiving slot of said base;
   said cradle secured to an upper end of said leg member, said inner surface including at least one opening and at least one repositionable projection mounted in said at least one opening, said at least one repositionable projection extending radially inward from a middle portion of said cradle to balance and support the heating device wherein said cradle is oriented at an angle and said at least one projection can support the heating device resting in said cradle with a distal end of said heating device oriented in an obliquely downward angle and an obliquely upward angle; and a cover unit attached to said base, said cover unit including a bottom portion curving into an end section and two sidewalls projecting from said bottom portion.

6. The heating tool set of claim 5, wherein said at least one repositionable projection on said inner surface of said cradle is selected from the group consisting of: a ridge, at least two pillars configured as quadratic prisms, and at least two projecting bumps formed in hemispherical shapes mounted on said middle portion inner surface of said cradle.

7. The heating tool set of claim 5, further comprising:

a mount on said cradle to attach said cradle to said leg member, said mount including a pair of receiving sections; and a cover unit including two rods inserted into said receiving sections of said mount, said cover unit further including a seat shaped section including a base curving into an end section and two sidewalls.

8. The heating tool set of claim 7, wherein said cover unit further comprises said end section and said sidewalls fabricated from metal or a heat resistant plastic material.

9. The heating tool set of claim 1, wherein said inner surface of said cradle includes orifices and said projection on said inner surface of said cradle is selected from the group consisting of projecting pillars, projecting bumps, and a ridge each of which having an underside structure allowing said projection to be secured to said orifices of the inner surface of said cradle at various axial positions in said cradle.

10. The heating tool set of claim 1, further comprising:

a mount on said cradle to attach said cradle to said leg member, said mount including a pair of receiving sections; and a cover unit including two rods inserted into said receiving sections of said mount, said cover unit further including a seat shaped section including a base curving into an end section and two sidewalls.

11. The heating tool set of claim 10, wherein said cover unit further comprises said end section and said sidewalls fabricated from metal or a heat resistant plastic material.

12. The heating tool set of claim 1, wherein said insulated handle section including a second cylindrical section extending to a distal end of said insulated handle section.

* * * * *

UNITED STATES PATENT AND TRADEMARK OFFICE
CERTIFICATE OF CORRECTION

| | |
|---|---|
| PATENT NO. | : 11,517,971 B2 |
| APPLICATION NO. | : 15/930279 |
| DATED | : December 6, 2022 |
| INVENTOR(S) | : Yoshitomo Teraoka and Hisao Nemoto |

It is certified that error appears in the above-identified patent and that said Letters Patent is hereby corrected as shown below:

On the Title Page

Please add:
Item (62) Related U.S. Application Data:
Divisional of U.S. Application Number 15/171776 filed June 2, 2016
Item (30) Foreign Application Priority Data:
Dec. 9, 2015 (JP) .....JP2015-240036

Signed and Sealed this
Thirty-first Day of January, 2023

Katherine Kelly Vidal
*Director of the United States Patent and Trademark Office*